Dec. 1, 1942.                    R. L. ARCHER                    2,303,784
                     METHOD OF MAKING STEERING KNUCKLES
                        Filed Aug. 3, 1940            3 Sheets-Sheet 1
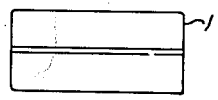
Fig. 1
Fig. 2
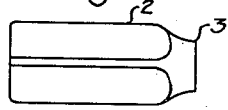
Fig. 3
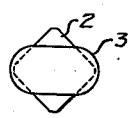
Fig. 4
Fig. 23
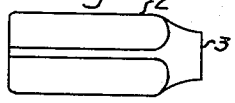
Fig. 5
Fig. 6
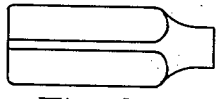
Fig. 7
Fig. 8
Fig. 24
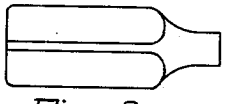
Fig. 9
Fig. 10
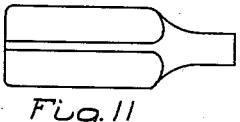
Fig. 11
Fig. 12
Fig. 25
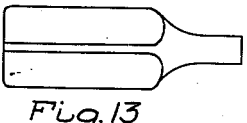
Fig. 13
Fig. 14
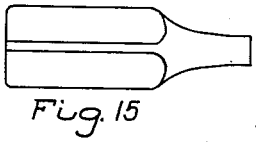
Fig. 15
Fig. 16
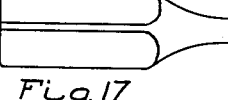
Fig. 17
Fig. 18
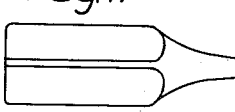
Fig. 19
Fig. 20
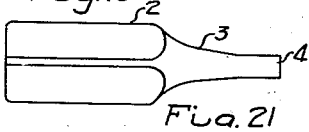
Fig. 21
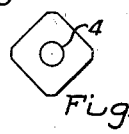
Fig. 22
INVENTOR.
RICHARD L. ARCHER
BY *Fay, Golrick, Williams & Fay*
ATTORNEYS.

Dec. 1, 1942.  R. L. ARCHER  2,303,784
METHOD OF MAKING STEERING KNUCKLES
Filed Aug. 3, 1940  3 Sheets-Sheet 2

INVENTOR.
RICHARD L. ARCHER
BY
ATTORNEYS.

Dec. 1, 1942.   R. L. ARCHER   2,303,784
METHOD OF MAKING STEERING KNUCKLES
Filed Aug. 3, 1940   3 Sheets-Sheet 3
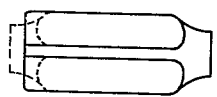
Fig. 30
Fig. 31
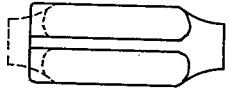
Fig. 32
Fig. 33
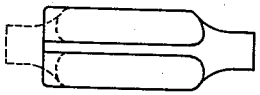
Fig. 34
Fig. 35
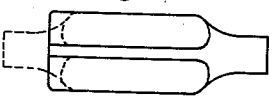
Fig. 36
Fig. 37
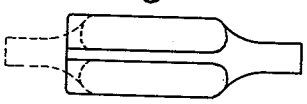
Fig. 38
Fig. 39
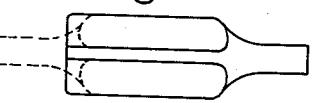
Fig. 40
Fig. 41
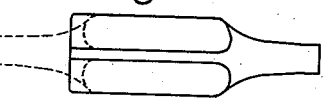
Fig. 42
Fig. 43
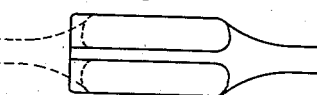
Fig. 44
Fig. 45
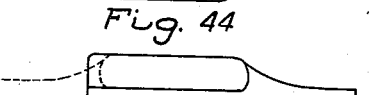
Fig. 46
Fig. 47
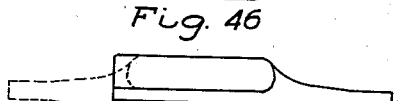
Fig. 48
Fig. 49
INVENTOR.
RICHARD L. ARCHER
BY
ATTORNEYS.

Patented Dec. 1, 1942

2,303,784

UNITED STATES PATENT OFFICE 2,303,784

METHOD OF MAKING STEERING KNUCKLES

Richard L. Archer, Bratenahl, Ohio, assignor to The Mid-West Forge Company, Cleveland, Ohio, a corporation of Ohio Application August 3, 1940, Serial No. 350,604

5 Claims. (Cl. 29—152)

This invention relates, as indicated, to a method of making steering knuckles.

A primary object of the invention is to provide a method of making steering knuckles, in which a blank of predetermined length and cross-section is first reduced by means of a series of roll-forging operations to a form in which it can be hammered or pressed to final or substantially final form by means of a hammer or press-forging operation.

Another object of the invention is to provide a method of making steering knuckles in which the blank after initial heating thereof need not be reheated at any time during the roll-forging operations.

A further object of the invention is to provide a steering knuckle having desirable physical characteristics, particularly as to the arrangement of the grain, and as to freedom from flash and other surface imperfections.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings:

Fig. 1 is a side elevation of a blank which is adapted to be used for forming into a pair of steering knuckles;

Fig. 2 is an end elevation of the blank;

Fig. 3 is a view similar to Fig. 1, but showing the blank as it appears after the first roll-forging pass;

Fig. 4 is an end view of the blank shown in Fig. 3;

Figs. 5, 7, 9, 11, 13, 15, 17, 19 and 21 are views similar to Fig. 3, but showing the blank, as it appears after the succeeding roll-forging operations, Fig. 21 showing the steering knuckle blank ready for the hammer or press-forging operations;

Figs. 6, 8, 10, 12, 14, 16, 18, 20 and 22 are views similar to Fig. 4, but corresponding to Figs. 5, 7, 9, 11, 13, 15, 17, 19 and 21 respectively;

Fig. 23 is a plan view of the blank of Fig. 21, after being subjected to the first stage of the hammer or press forging operations;

Fig. 24 is a cross-sectional view of the blank, taken on the line 24—24 of Fig. 23;

Fig. 25 is a view of the rear end of the blank shown in Fig. 24;

Fig. 30 is a side elevation of a blank which is adapted for forging into a pair of steering knuckles by a slightly different method, as it appears after the first roll forging pass;

Fig. 31 is an end elevation of the blank;

Figs. 32, 34, 36, 38, 40, 42, 44, 46 and 48 are views similar to Fig. 30, but showing the blank, as it appears after the succeeding roll-forging operations, the dotted lines indicating the steps in the roll-forging of the other end of the blank after the end illustrated in solid lines has been forged to the shape shown in Fig. 48;

Figs. 33, 35, 37, 39, 41, 43, 45, 47 and 49 are views similar to Fig. 32, but corresponding to Figs. 32, 34, 36, 38, 40, 42, 44, 46 and 48, respectively.

Figure 26:
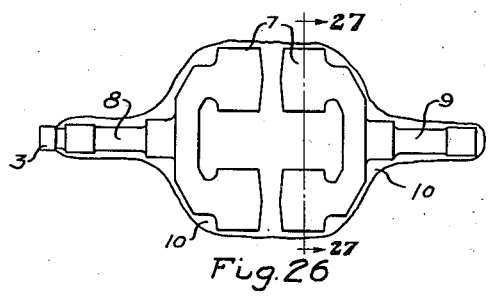
Fig. 26 is a plan view of the blank, after being subjected to the second stage of the hammer or press forging operations.

Referring more particularly to Figs. 1 to 29 inclusive, bar stock of a weight and size suitable for manufacture into steering knuckles, and of a symmetrical or generally rectangular cross-section, is sheared into a plurality of blanks I, each of which is of a length sufficient to provide a pair of steering knuckles.

The blank I is then heated to a suitable roll forging temperature, and is then roll forged, to the form shown in Figs. 21 and 22 in a roll forging mill of the type disclosed in the patent to F. H. Moyer, No. 1,736,321, such mill comprising a pair of spaced housings in which are journalled rolls provided with removable forging dies arranged to cooperate to produce a forged article. Each of the dies is provided with a series of circumferential grooves, and the grooves in one die cooperate with the corresponding grooves in the other die to provide a plurality of passes through which the blank is adapted to be successively passed to provide the desired blank.

In the use of roll forging mills of the aforesaid character, the operator grips the heated bar blank I with a pair of tongs and passes the blank between the rolls when the dies of the latter are out of pass-defining relationship, the position of the blank or partly finished product being determined by suitable stops at the rear of the mill. With the bar blank thus positioned, and the rolls revolving in a direction toward the operator, the dies grip the blank and roll it outwardly towards the operator, the blank being rolled to the shape of the grooves in the dies and the appearance of the blank after such rolling in the first pass of the mill being shown in Figs. 3 and 4. As the result of this first pass, the major portion 2 of the blank remains virtually unchanged, but one end thereof is given a taper so as to form a spindle portion 3 of generally oval cross-section, the major axis of the oval lying in a plane parallel to the axis of the rolls.

Thereafter, the blank is rotated approximately 90 degrees about its axis so as to present the major axis of the spindle portion 3 to the second pass of the rolls. The blank is then rolled in the second pass of the rolls and emerges in the form shown in Figs. 4 and 5, the spindle portion 3 having been elongated to some extent and flattened to an oval form in which what was formerly the minor axis now becomes the major axis of the oval.

The operations of turning the blank approximately 90 degrees about its axis are repeated for each of the succeeding passes, and the appearance of the blank, as it emerges from each of the successive passes is shown in Figs. 7 to 22 inclusive.

By turning the blank about its axis for each pass following the first, the formation of flash on the blank at all stages in the roll forging thereof is precluded, and at the same time, the metal is worked in such a manner as to equalize the stresses therein and produce a desired arrangement of the grain, as well as a proper flow of the metal.

In order to increase production and produce blanks which are somewhat more uniform in character than those which can be produced by an operator handling a pair of tongs, the blanks, as shown in Figs. 21 and 22, may be manufactured automatically, as by means of apparatus shown in Ferm Patent No. 2,183,557, in which a blank holding a chuck is arranged to be successively aligned with each of the roll passes.

The blank, as shown in Figs. 21 and 22, and having a circular projection 4 at one end, which is adapted to be grasped by a pair of tongs, is then reheated to a forging temperature, is gripped at its circular front end by means of tongs in the hands of an operator, and is subjected to from three to six blows of a hammer press, whereby it is given the form shown in Figs. 23, 24 and 25, that is to say, the rear portion of the rectangular body of the blank is reduced to form a tapered spindle portion 5, similar in general contour to the spindle portion 3. At the same time, the body portion 1 is provided with a notch or recess 6 at its center, which notch serves to locate the body portion 1 with respect to a double-impression die in the next stage of the hammer press forging operation.

Figure 27:
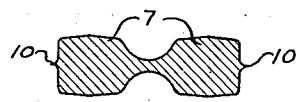
Fig. 27 is a cross-sectional view, taken on the line 27—27 of Fig. 26.

The blank, as shown in Fig. 23, is then subjected to from four to six blows between double-impression dies in a hammer press, whereby it is given the form shown in Figs. 26 and 27, that is to say, it is brought to the general conformity of a pair of connected steering knuckles, but not to exact size. In this form, the central or body portion 1 of the blank is utilized to form the yokes 7 of the steering knuckles and the spindle portions 3 and 5 are utilized to form the spindles 8 and 9 of the steering knuckles, a certain amount of flash, indicated by the numeral 10 being formed, which surrounds and interconnects the steering knuckles.

Figure 28:
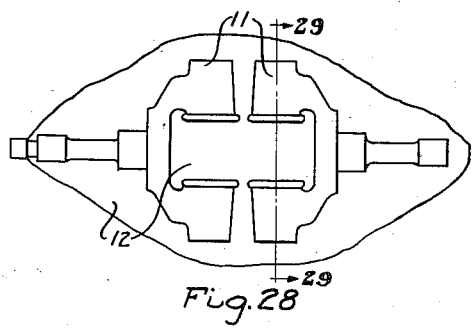
Fig. 28 is a plan view of the blank, after being subjected to the third and final stage of the hammer or press forging operations.
Figure 29:
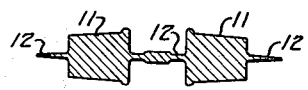
Fig. 29 is a cross-sectional view, taken on the line 29—29 of Fig 28.

After this operation, the blank is reheated to a suitable forging temperature, and is then subjected to a final or finish forging operation, comprising two to three blows between double-impression dies in a hammer press, whereby it is given the form shown in Figs. 28 and 29, that is to say, it is brought to finish forged size. In this form, the blank consists of a pair of steering knuckles 11, connected and surrounded by flash 12, which, in a subsequent trimming operation, is removed, leaving a pair of steering knuckles, which are ready for the machining or finishing operations.

Referring now to Figs. 30 to 49 inclusive, bar stock identical with that used for forming the blank shown in Fig. 1, is used, and is sheared into a plurality of blanks, each of which is of a length sufficient to provide a pair of steering knuckles. This blank is then roll-forged in the same manner as the blank shown in Figs. 1 and 2 so as to provide a spindle portion at one end which is identical in every respect with that shown in Figs. 21 and 22, and which is shown in solid lines in Figs. 48 and 49. The other end of the blank is then roll-forged in a similar manner as illustrated by the dotted lines in Figs. 30, 32, 34, 36, 38, 40, 42, 44, 46 and 48 to provide a spindle portion identical with that shown in solid lines.

The blank of Figs. 48 and 49 is then subjected to hammer pressing operations to form a pair of steering knuckles in the same manner as the blank shown in Figs. 21 and 22, it being noted that only those operations are omitted which result in the formation of the blank illustrated in Figs. 23, 24 and 25.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. The method of making a steering knuckle which comprises providing a blank of generally rectangular cross-section, roll-forging a portion of said blank to provide a tapered spindle portion by means of a series of roll-forging passes in each of which said portion of the blank is rolled to an oval cross-section, the blank being turned about its axis between each pass so as to present the long axis of each oval to the action of the rolls in each pass, the portion of the blank which is to provide the yoke portion of the knuckle remaining substantially unchanged during the aforesaid spindle rolling operations, and then hammer-forging the blank to substantially the finished form of a steering knuckle.

2. The method of making a steering knuckle which comprises providing a blank of symmetrical cross-section, roll-forging a portion of said blank to provide a tapered spindle portion by means of a series of roll-forging passes in each of which said portion of the blank is rolled to a cross-section having a major and a minor axis, the blank being turned about its longitudinal axis between each pass so as to present the major axis to the action of the rolls in each pass, and then hammer or press forging the blank to substantially the finished form of a steering knuckle.

3. The method of making a pair of steering knuckles which comprises providing a blank of symmetrical cross-section, and of a length sufficient to provide said pair of knuckles, roll forging the end portions of said blank to provide tapered spindle portions while leaving the intermediate portion of the blank substantially unchanged, and then hammer forging the blank to substantially the finished form of a pair of steering knuckles, the yoke portions of both of said knuckles being formed from said intermediate portion of the blank.

4. The method of making a steering knuckle, which comprises providing a blank of generally rectangular cross-section, roll-forging a portion of said blank to provide a tapered spindle portion by means of a series of roll-forging passes, the blank being turned about its longitudinal axis between each pass so as to alternately present different transverse axes of the blank to the action of the rolls while leaving the portion of the blank which is to provide the yoke portion of the knuckle substantially unchanged, and then hammer-forging the blank to substantially the finished form of a steering knuckle.

5. The method of making a steering knuckle which comprises providing a blank of generally rectangular cross-section, roll-forging an end portion of said blank to provide a tapered spindle portion at one end of the blank by means of a series of roll-forging passes, the blank being turned about its longitudinal axis between each pass so as to alternately present different transverse axes of the blank to the action of the rolls while leaving the immediate adjacent portion of the blank which is to provide the yoke portion of the knuckle substantially unchanged, then hammer-forging the blank to substantially the finished form of a steering knuckle having a fin projecting therefrom and then removing said fin.

RICHARD L. ARCHER.